June 20, 1961  M. V. HOPPENWORTH  2,989,125
DIFFERENTIAL SYSTEM WITH VARIABLE DIAMETER SHEAVES
Filed May 27, 1959  2 Sheets-Sheet 1

INVENTOR.
MARVIN V. HOPPENWORTH
BY
ATTORNEY
Glenn H. Antrim
AGENT

June 20, 1961 M. V. HOPPENWORTH 2,989,125
DIFFERENTIAL SYSTEM WITH VARIABLE DIAMETER SHEAVES
Filed May 27, 1959 2 Sheets-Sheet 2
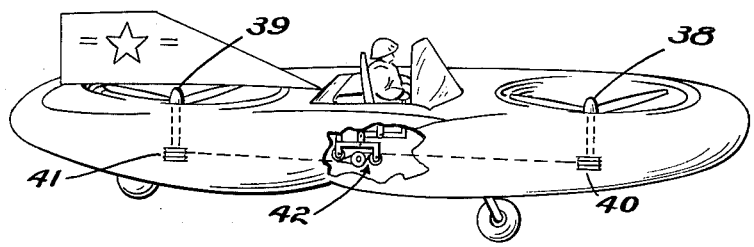
FIG. 2
FIG. 3
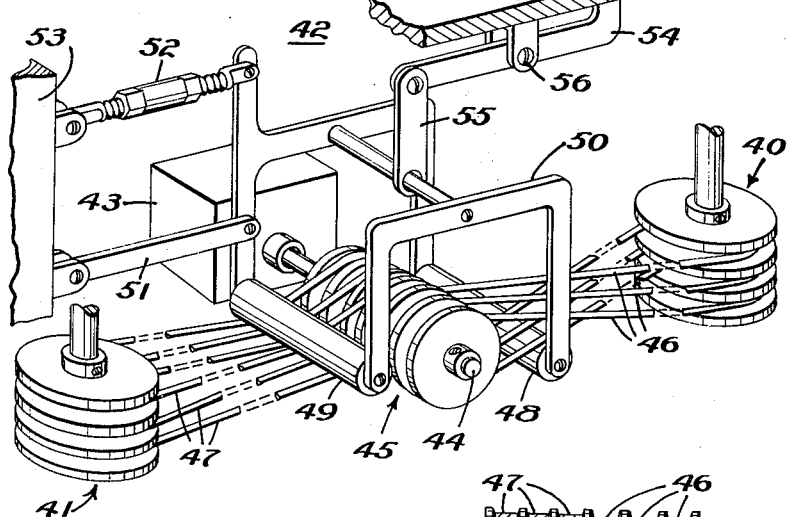
FIG. 3a FIG. 3b
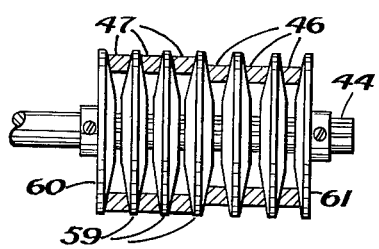
INVENTOR.
MARVIN V. HOPPENWORTH
BY
ATTORNEY
AGENT

United States Patent Office 2,989,125
Patented June 20, 1961

2,989,125
DIFFERENTIAL SYSTEM WITH VARIABLE DIAMETER SHEAVES
Marvin V. Hoppenworth, Cedar Rapids, Iowa, assignor to Collins Radio Company, Cedar Rapids, Iowa, a corporation of Iowa
Filed May 27, 1959, Ser. No. 816,183
2 Claims. (Cl. 170—135.24)

This invention pertains to differential systems for multiple rotating-wind aircraft and particularly to differential systems which utilize variable pulleys or sheaves.

In order to provide thrust for forward flight of vertical take-off-and-land (VTOL) aircraft of the type having fore and aft rotating wings or rotors that rotate on axes perpendicular to the main plane of the aircraft, means must be provided for maintaining the nose slightly downward. During forward flight of the aircraft the air stream about the structure of the craft constantly opposes downward pitch. The desired attitude for forward flight may be attained by having the fore rotor provide less lift than that provided by the aft rotor. Obviously in vertical flight the aircraft must be horizontal and the lift of the two rotors must be equal. In a simple type of aircraft that resembles a flying platform, the pitch of each its rotors is maintained constant and differences in lift of its two rotors are provided by varying their relative rates of rotation.

An object of this invention is to control the pitch of a VTOL aircraft by varying the relative speeds of rotation of the rotors through adjustment of variable-speed sheaves.

A feature of the system that utilizes variable-speed sheaves is its simplicity and reliability.

The following description and the appended claims may be more readily understood with reference to the accompanying drawings, in which:

FIGURE 2 shows a VTOL aircraft having a pair of rotors that are controlled by the variable speed system shown in FIGURE 3; and FIGURE 3 shows a modification of the variable speed system of FIGURE 1 wherein the differential gear system has been omitted so that the power is transmitted to the rotors through only a V-belt system that includes an adjustable diameter multigroove sheave.

Figure 1:
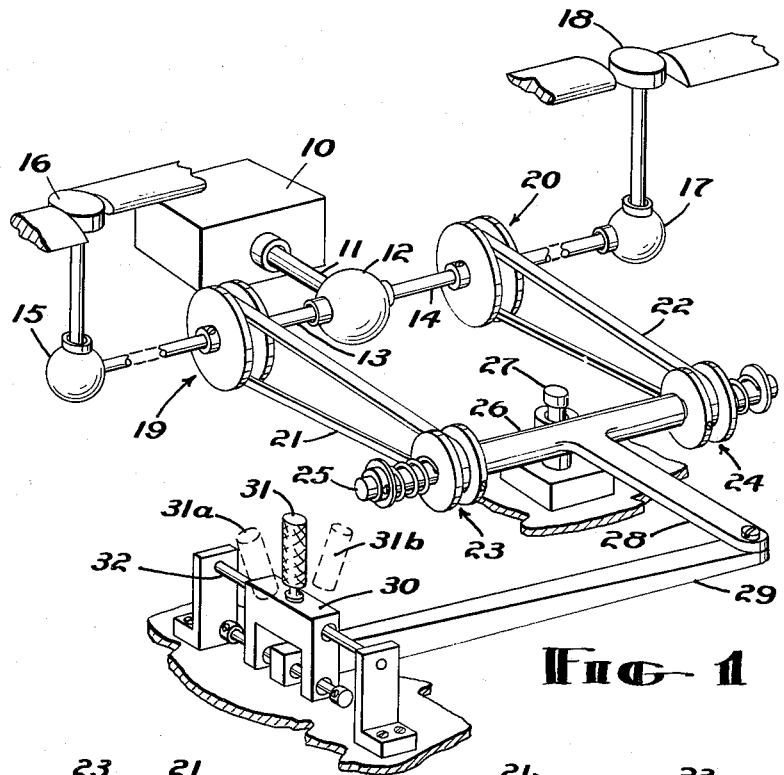
FIGURE 1 shows a V-belt transmission system that utilizes a pair of variable diameter sheaves in combination with a differential gear system for transmitting power to a pair of rotors in an aircraft.

According to FIGURE 1 aircraft engine 10 is coupled through drive shaft 11 to the input of the differential gear 12. The output of the differential gear is applied to opposite drive shafts 13 and 14. Drive shaft 13 is coupled through the miter gear 15 to rotor 16 and drive shaft 14 is coupled through miter gear 17 to rotor 18. In addition to shafts 13 and 14 being coupled through differential 12, the shafts are coupled through a variable speed system that comprises a pair of sheaves 19 and 20 of fixed diameter, a pair of V-belts 21 and 22, and a pair of variable diameter sheaves 23 and 24. Sheaves 19 and 20 are secured to drive shafts 13 and 14 respectively.

The variable diameter sheaves 23 and 24 are spaced apart at a distance equal to the distance between constant diameter sheaves 19 and 20 and securely mounted to rotary control shaft 25. Shaft 25 is rotatably mounted in sleeve 26 that is substantially parallel to shafts 13 and 14. Sleeve 26 is rotatably mounted on supporting shaft 27 that is perpendicular to that plane which includes shafts 13, 14, and 25. Each variable sheave is properly positioned opposite a respective fixed sheave for receiving a respective driving V-belt 21 or 22. The effective diameters of the variable sheaves are controlled by handle 31 that is coupled to lever arm 28. Lever arm 28 extends perpendicular from shaft mounting sleeve 26 in the same plane as the shafts. This lever is coupled through connecting arm 29 to lever 30 to which the handle 31 is attached. The lever 30 which functions as an intermediate fulcrum is pivoted on rod 32.

Figures 1A, 1B:
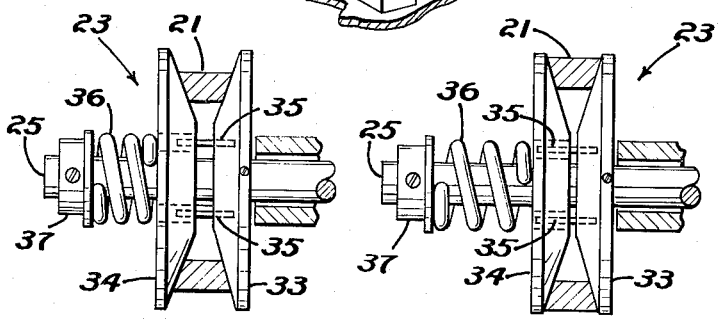

In order to clarify the operation of the variable speed system, the variable diameter sheave assembly 23 is shown in detail for two different speed settings in FIGURES 1A and 1B. The flange 33 of sheave 23 is secured to the shaft 25. The flange 34 of the sheave is slidable along the shaft between the fixed flange 33 and a limiting position determined by the position of the adjacent spring 36. The slidable flange may be splined to the shaft or may be the type shown that has pins 35 extending from the fixed flange and engaging opposite holes in the slidable flange. A helical spring 36 that is mounted on shaft 25 is maintained in compression between the outer face of slidable flange 34 and a retaining collar 37 that is secured to shaft 25.

When handle 31 is in position 31a, the distance between sheaves 19 and 23 is increased so that the tension of belt 21 is increased for compressing spring 36. In response to tightening of the belt 21, the belt rotates on a smaller diameter of sheave 23 for decreasing the rotational speed of sheave 23 with respect to sheave 19. At the same time the distance between sheaves 20 and 24 has been increased so that belt 22 operates on a larger diameter over sheave 24. When handle 31 is operated to position 31b the distance between sheave 19 and sheave 23 is decreased so that belt 21 operates on a greater diameter as shown in FIGURE 1b.

A VTOL aircraft having a fore rotor 38 and an aft rotor 39 is shown in FIGURE 2. The fore and aft rotors 38 and 39 are driven through a multiple fixed diameter sheaves 40 and 41 that are coupled through multiple V-belts to the engine. The relative speeds of the rotors are determined by a differential controller 42 that is shown in detail in FIGURE 3.

The differential controller of FIGURE 3 has a pair of rollers bearing against multiple V-belts for varying the relative rates of rotation of sheaves 40 and 41. The aircraft engine 43 is coupled to output shaft 44 on which is mounted a multiple adjustable sheave assembly 45. One-half of the number of the V-belts 46 that are driven by sheave 45 engage sheave 40 for driving the fore rotor of the aircraft and the remaining V-belts 47 engage sheave 41 for driving the aft rotor.

The pair of rollers 48 and 49 that engage the outer surfaces of V-belts 46 and 47 respectively are rotatably mounted on carrier 50 such that roller 49 is disposed above the V-belts 47 and roller 48 is disposed below the V-belts 46. The carrier 50 is movably mounted to the aircraft frame by arm 51 and adjustable arm 52. One end of each of these arms is pivotally mounted to carrier 50 and the opposite end of each arm is pivotally mounted to a fixed portion 53 of the aircraft frame.

An operating lever 54 is connected to the upper central portion of carrier 50 through connecting link 55. The lever has an intermediate pivot 56. A downward force on handle 57 of lever 54 raises carrier 50 so as to increase the force that is applied by roller 48 to belts 46 and to decrease the force that is applied by roller 49 to belts 47. Conversely an upward force on handle 57 moves the carrier 50 downward so as to decrease the force applied by roller 48 and to increase the force applied by roller 49.

The construction of sheave 45 can best be understood by reference to FIGURES 3a and 3b. Each of the intermediate flanges 59 of sheave 45 has a grooved opening 58 for engaging splineways on shaft 44. The splines allow the intermediate flanges of sheave 45 to be moved axially along shaft 44 but restrain them from rotating on the shaft. The end flanges 60 and 61 are tightly secured to shaft 44. When carriage 50 is in an upward position for applying force to belts 46, the belts 46 are moved inward on their respective flanges whereas belts 47 are moved outward as shown in FIGURE 3b. Obviously the application of force in an opposite direction on carrier 50 would cause belts 47 to move inward on sheave 45 and the belts 46 to move outward.

In a system according to FIGURE 1 most of the power from engine 10 is transmitted through differential gear system 12 but the rates of rotation of the output shafts 13 and 14 are controlled by the V-belt system. Since in this system only a portion of the power is transmitted through the V-belts, fewer belts are required than for the system of FIGURE 3 in which the entire output power of the engine is transmitted through V-belts.

In the system shown in FIGURES 1 and 3 the aircraft is controlled most easily by having the pitch of the blades of the fore rotors less than the pitch of the blades of the aft rotors. Then when the rotors are rotated at the same speed, the lift of the fore rotor is slightly less than that of the aft rotor. This difference in lift provided by the rotors compensates for the greater lift applied to the fore part of the aircraft by the air stream that results from forward flight. The nose is, therefore, pitched downward the required amount for forward flight at cruising speed while the tensions on the V-belts of the respective systems are equalized.

When it is desired to ascend vertically, the handle of the system in FIGURE 1 is moved to position 31a so as to increase the tension on belt 21 that is driven from the aft shaft and to decrease the tension on belt 22 that is driven from the fore shaft. The sheave 23 that is coupled through belt 21 to the aft shaft will, therefore, have a smaller effective diameter than sheave 24 that is coupled through belt 22 to the fore shaft 14. Since adjustable sheaves 23 and 24 rotate at the same rate, a portion of the power that is applied through differential 12 to shaft 13 is applied through the V-belt system to shaft 14 to cause rotor 18 to rotate at a faster speed than rotor 16. The increased rate of rotation of rotor 18 compensates for its decreased pitch in order that the lift of rotor 18 is equal to the lift of rotor 16. The aircraft will then ascend, hover, or descend according to the total power supplied from engine 10. After the aircraft has attained a desired altitude, the handle 31 is returned to its central or normal position to equalize the tensions on belts 21 and 22 so that the adjustable sheaves 23 and 24 have the same effective diameters. Rotor 18 then operates at the same speed as that of rotor 16 but because of its smaller pitch provides less lift. The rotors are then inclined forward and provide forward thrust in addition to lift.

When the system of FIGURE 3 is used to control the VTOL aircraft of FIGURE 2 and it is desired to fly vertically upward, upward force is applied to handle 56 so that the force applied to belts 46 by roller 48 is decreased while the force applied by roller 49 to belts 47 is increased. In response to the change in tension on belts 46 and 47, the intermediate flanges of sheave 45 will move outward on shaft 44 so that the sheave 45 has an effectively smaller diameter for belts 47 than it has for belts 46. The fore rotor that is directly coupled to sheave 40 will, therefore, rotate at a rate of speed that is higher than the speed of the aft rotor which is directly coupled to sheave 41.

As described for the system of FIGURE 1, the increased rate of rotation of the fore rotor compensates for its smaller pitch and the aircraft rises vertically. After the aircraft has attained the desired altitude and the control handle 56 has been returned to an intermediate position, horizontal flight can be maintained with the application of only moderate corrective forces to the control handle. When handle 57 has been returned to a central position so that the force on rollers 48 and 49 are equalized, the rates of rotation of the fore and aft rotors are equal. In order to increase the forward velocity of the aircraft above its normal cruising speed the engine speed may be increased and a downward force may be applied to handle 57. The tension that is applied to belts 46 is, therefore, greater than the tension applied to belts 47. The lift of the aft rotor is, therefore, increased relative to the lift of the fore rotor so that the nose of the aircraft is pitched downward at a greater angle and the forward speed of the aircraft will be increased.

Although this invention has been described with respect to particular embodiments thereof, it is not to be so limited, as changes and modifications may be made therein which are within the scope and spirit of the invention as defined by the appended claims.

What is claimed is:

1. In an aircraft having an engine and first and second sustaining rotary wings mounted on spatially-separated shafts, a variable speed power transmission system connected between an output shaft of said engine and said shafts of said rotary wings, said transmission system comprising in combination a differential gear system and a variable diameter sheave system, said differential gear system having an input connected to said output shaft of said engine and a differential output shaft connected respectively to each of the shafts of said rotary wings, said variable sheave system having a first sheave drivingly coupled to each of said differential output shafts and a second sheave mounted opposite each of said first sheaves, a belt drive engaging each of said respective opposite first and second sheaves, means for coupling said second sheaves invariably together, at least one of said sheaves coupled by each of said belt drives having an effective diameter varying inversely with the tension applied to the respective belt drive, and means for increasing the tension on one of said belt drives and simultaneously decreasing the tension on the other of said belt drives for changing the ratio of the relative speeds of rotation of said rotary wings.

2. A variable speed transmission system as claimed in claim 1 wherein said differential output shafts are collinear, said means for coupling said second sheaves together being a control shaft that is parallel to said differential output shafts, said second sheaves being securely mounted to said control shaft, and said means for changing the tensions on said belt drives including means for rotating said control shaft about an axis that is perpendicular to the plane that contains all of said shafts.

References Cited in the file of this patent

UNITED STATES PATENTS

| | | |
|---|---|---|
| 1,055,533 | Highland | Mar. 11, 1913 |
| 2,327,370 | Pullin | Aug. 24, 1943 |
| 2,847,173 | McCarty | Aug. 12, 1958 |